United States Patent [19]
Gabzdyl et al.

[11] Patent Number: 6,145,076
[45] Date of Patent: Nov. 7, 2000

[54] SYSTEM FOR EXECUTING NESTED SOFTWARE LOOPS WITH TRACKING OF LOOP NESTING LEVEL

[75] Inventors: Rebecca Gabzdyl, Frimley; Brian Patrick McGovern, Camberley, both of United Kingdom; Matti Juhani Vehvilainen, Tampere, Finland

[73] Assignee: Nokia Mobile Phones Limited, Espoo, Finland

[21] Appl. No.: 09/037,445

[22] Filed: Mar. 10, 1998

[30] Foreign Application Priority Data

Mar. 14, 1997 [GB] United Kingdom .................. 9705365

[51] Int. Cl.⁷ ......................................... G06F 9/30
[52] U.S. Cl. ............................................. 712/241
[58] Field of Search ..................................... 712/241

[56] References Cited

U.S. PATENT DOCUMENTS

| | | | |
|---|---|---|---|
| 4,652,997 | 3/1987 | Kloker | 712/241 |
| 5,289,059 | 2/1994 | Pikkarainen | 307/520 |
| 5,365,119 | 11/1994 | Kivari | 327/115 |
| 5,375,238 | 12/1994 | Ooi | 712/241 |
| 5,387,874 | 2/1995 | Rapeli | 327/337 |
| 5,390,223 | 2/1995 | Lindholm | 377/49 |
| 5,481,723 | 1/1996 | Harris et al. | 395/700 |
| 5,497,116 | 3/1996 | Rapeli | 327/337 |
| 5,581,776 | 12/1996 | Hagqvist et al. | 395/590 |
| 5,657,485 | 8/1997 | Streitenberger et al. | 712/241 |
| 5,710,913 | 1/1998 | Gupta et al. | 712/241 |
| 5,958,048 | 9/1999 | Babaian et al. | 712/241 |

FOREIGN PATENT DOCUMENTS 0 487 082 A2  5/1992  European Pat. Off. .
2 163 279    2/1986  United Kingdom .

*Primary Examiner*—Richard L. Ellis
*Attorney, Agent, or Firm*—Perman & Green, LLP

[57] ABSTRACT

A data processing circuit is arranged to execute program instructions defining nested loops. A loop is defined in terms of a start address, an end address and a number of loop iterations. The processing circuit includes a program counter and a plurality of loop counting elements. Each of the loop counting elements includes a start address register, an end address register, a loop iteration register and means for comparing the value stored in the respective end address register with the output from the program counter.

14 Claims, 11 Drawing Sheets

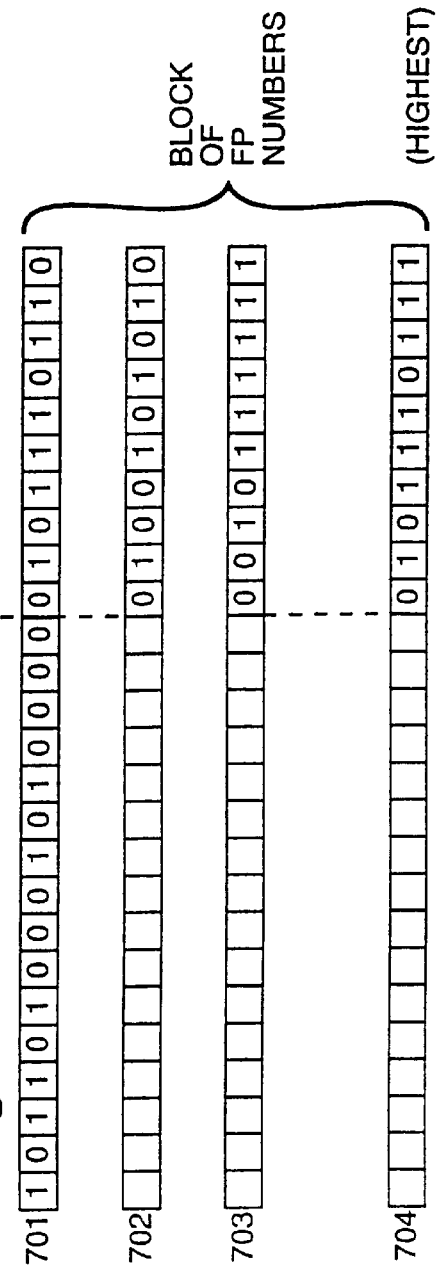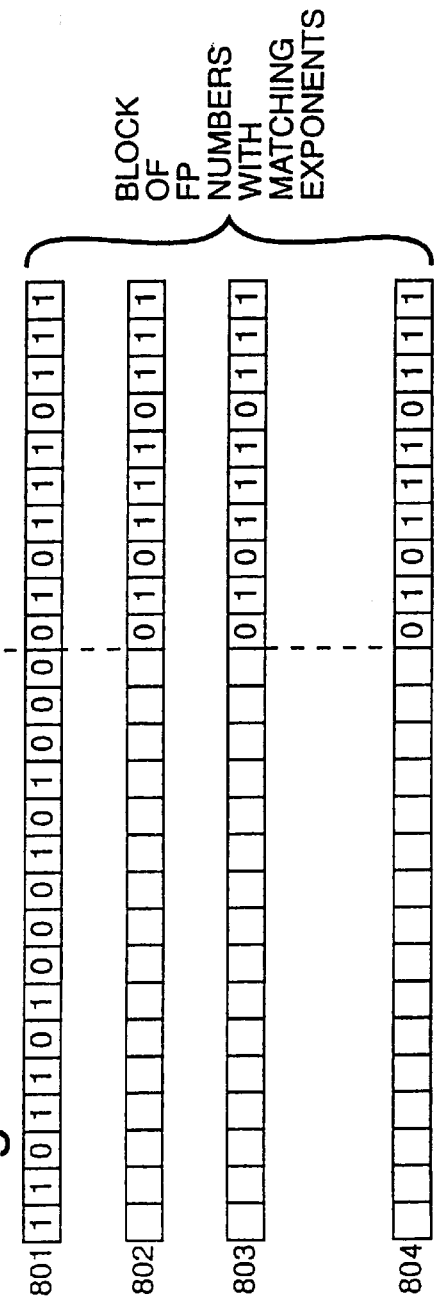

# 6,145,076

SYSTEM FOR EXECUTING NESTED SOFTWARE LOOPS WITH TRACKING OF LOOP NESTING LEVEL

BACKGROUND OF INVENTION

The present invention relates to a data processing circuit arranged to execute program instructions defining nested loops, wherein a loop is defined in terms of start address, an end address and a number of loop iterations.

The use of nested loops in the software arts is well established. Nested loops allow a relatively small amount of code to control a relatively large amount of processing and major advantages are obtained from software implementations by making use of a processor's ability to execute relatively simple operations many times in a reliable way. The nested loop approach is made possible by the inclusion of conditional jumps such that the processor is instructed as to when a loop has terminated.

Problems may occur when a condition which allows an inner loop to terminate also allows its associated outer loop to terminate. Under these conditions, a program counter may have been incremented, in response to completing the inner loop, without leaving sufficient time for the outer loop to terminate. When such a condition arises, the operation of the hardware causes an unintentional change in the program counter which causes the program to enter an unintended state, often resulting in system failure.

Hitherto, problems such as this have been addressed by including a "no-operation" (NOP) instruction before the terminating condition for the outer loop.

BRIEF SUMMARY OF INVENTION

According to the present invention, there is provided a data processing circuit arranged to execute program instructions defining nested loops, wherein a loop is defined in terms of a start address, an end address and a number of loop iterations, comprising program counting means; and a plurality of loop counting elements, wherein each of said loop counting elements includes a start address register, an end address register, a loop iteration register and means for comparing the value stored in the respective end address register with the output from said program counting means.

An advantage of the present invention is that the completion of a first inner loop count may coincide with a plurality of outer loop counts on the same clock cycle without risk of the program instructions becoming out of step with their associated hardware. The invention therefore provides a hardware enhancement to a processor circuit so as to relieve the burden placed upon an assembler or compiler used for converting high level code into executable instructions. That is to say, NOP instructions would be unnecessary for example.

In a preferred embodiment, the loop counting means are connected in cascade so that data identifying the completion of a lower level loop is conveyed to the next higher level loop.

Preferably, the loop counting means generate end of loop data to facilitate plural loop terminations.

In a preferred embodiment, a higher level loop counting means conveys loop size data to a lower level nested loop to facilitate triangulation looping. Triangulation looping is explained herebelow.

Preferably, the program counter and the loop counting elements form part of an instruction fetch circuit included as a sub-assembly of an integrated digital signal processing circuit. The digital signal processing circuit may form part of a mobile cellular telephone.

According to a second aspect of the present invention, there is provided a method of executing program instructions defining nested loops, wherein a loop is defined in terms of a start address, an end address and a number of loop iterations, comprising identifying program position by program counting means; and identifying the position within each loop by loop counting elements, wherein each of said loop counting elements stores a loop start address, a loop end address and a loop iteration number such that said elements are arranged to compare said stored loop values with said program count.

BRIEF DESCRIPTION OF DRAWINGS

FIG. 7 shows a block of floating point numbers;

FIG. 8 shows a block of floating point numbers similar to the block shown in FIG. 7, normalised so have to have matching exponent values;

DETAILED DESCRIPTION OF PREFERRED EMBODIMENTS

The invention will now be described by way of example only with reference to the previously identified drawings.

The present invention has many applications particularly in systems where cost is to be minimised. As an example of such an environment, the invention will be described with respect to a mobile telephone, although it should be appreciated that many other applications are also relevant.

Figure 1:
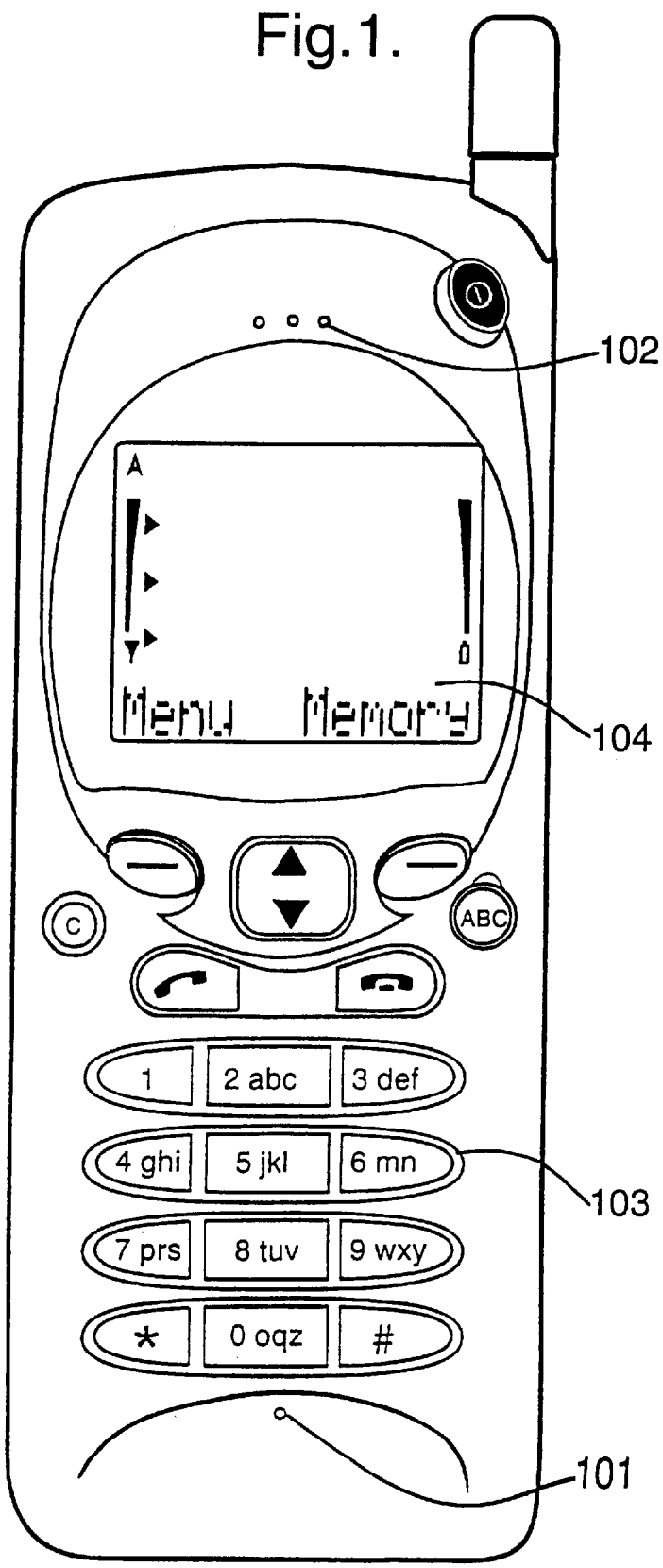
FIG. 1 shows a mobile telephone having digital signal processing circuitry.

A mobile telephone is shown in FIG. 1 configured to operate digitally in accordance with the GSM recommendations. The telephone includes a microphone 101 arranged to receive speech utterances in combination with a loudspeaker 102 arranged to supply received voice signals to an operator's ear. The telephone includes manually operable buttons 103 and a visual display 104.

Figure 2:
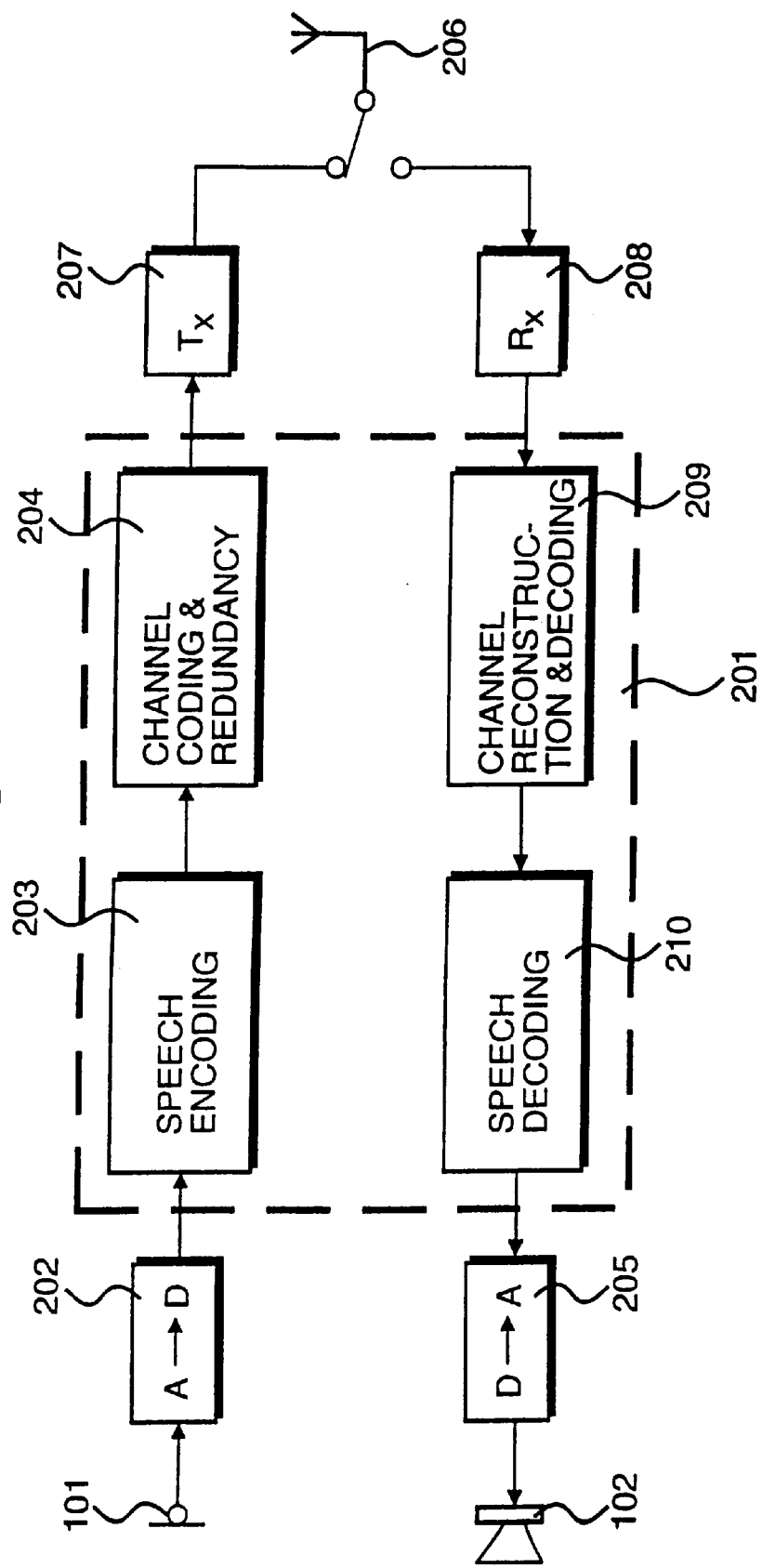
FIG. 2 shows the functionality of digital signal processing circuitry within the mobile telephone shown in FIG. 1, including a digital signal processor.

The mobile telephone shown in FIG. 1 includes a digital data processing circuit 201 as shown in FIG. 2. The processing circuit receives digital input signals from an analogue to digital converter 202 which in turn receives analogue speech signals from microphone 101. Within the data processing circuit 201, digital signals from the analogue to digital converter 202 are supplied to a speech encoding system 203 which in turn supplies encoded speech to a channel coding 204. Loudspeaker 102 receives an output from the data processing circuit 201 via a digital to analogue converter 205. Radio antenna 206 receives transmission signals from a transmitter 207 which is in turn arranged to receive outputs from the channel coding subsystem 204. The antenna 206 is also shared with a receiving circuit 208 which in turn supplies input signals to a channel reconstruction and decoding system 209 within the data processing circuit 201. The output from system 209 is supplied to a speech decoding subsystem 210 which in turn provides a digital speech signal to the digital to analogue converter 205.

Figure 3:
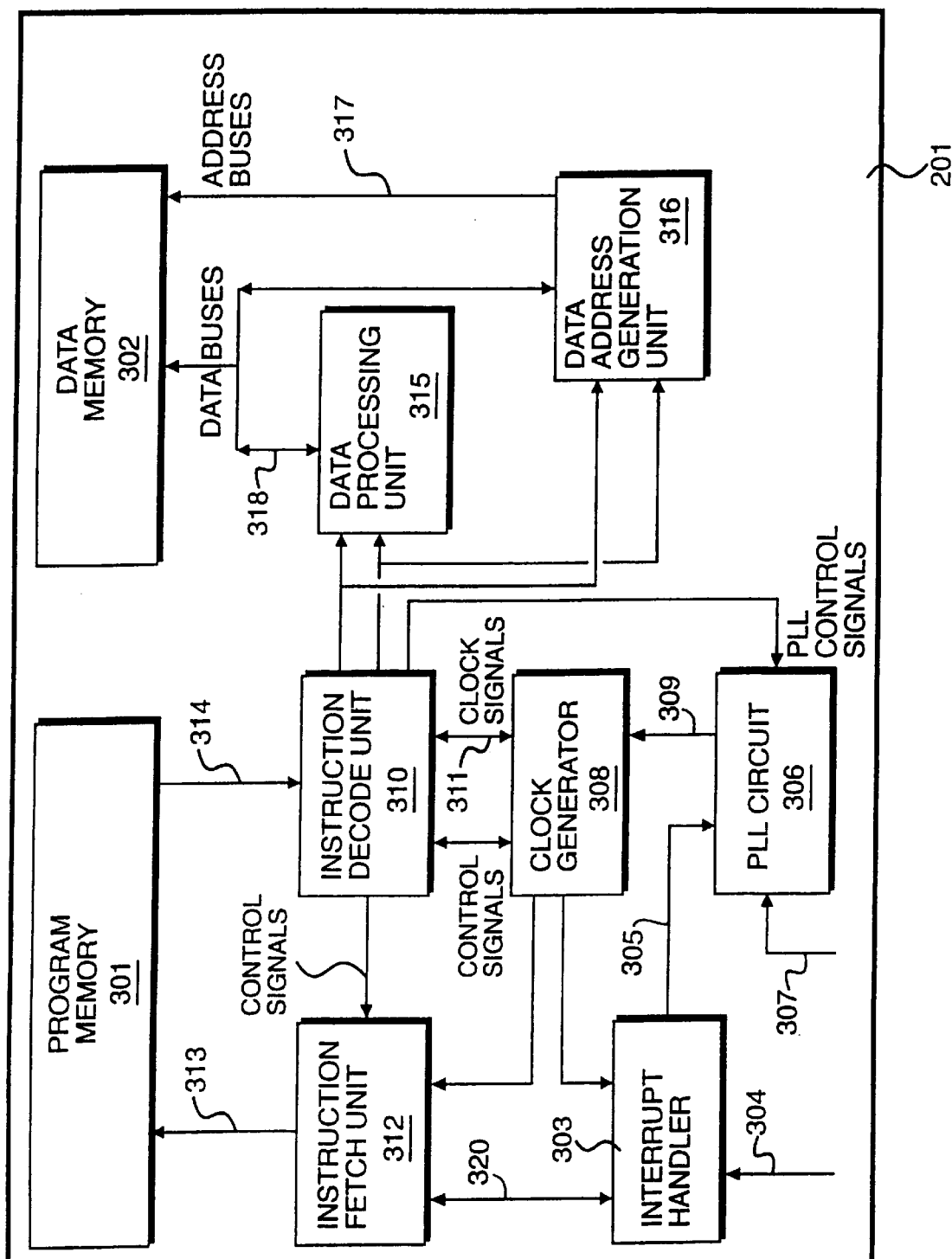
FIG. 3 details a digital signal processor of the type identified in FIG. 2, including an instruction decode unit.

The data processing circuit 201 is implemented as a programmable device capable of multiplexing processes 203, 204, 209 and 210. The hardware implementation of the processing circuit 201 is shown in FIG. 3, and includes a program memory 301 and a data memory 302. Processing circuit 201 is event driven which is to say that the circuit will be placed in an idle mode when no interrupts are pending. Interrupt signals are supplied to an interrupt handler 303 by interrupt lines 304. Upon receiving an interrupt, the interrupt handler supplies an enabling signal over a line 305 to a phase locked loop circuit 306. The phase locked loop circuit receives clocking signals from a system clock over a line 307 and is arranged to supply higher frequency clock signals to a clock generator 308 over a line 309.

The interrupt handling circuit 303 also supplies interrupt signals to an instruction fetch unit 312 over line 320 which in turn generates an address to the program memory 301 over an address bus 313. The resulting instruction read from program memory is returned to the instruction decode unit 310 over an instruction bus 314. The instruction decode unit 310 decodes the instruction read from program memory 301 and supplies appropriate control signals to a data processing unit 315 and a data address generation unit 316. The data address generation unit 316 addresses the data memory via an address bus 317 and the communication of data between the data memory 302 and the data processing unit 315 or the data address generating unit 316 occurs via a data bus 318.

Figure 4:
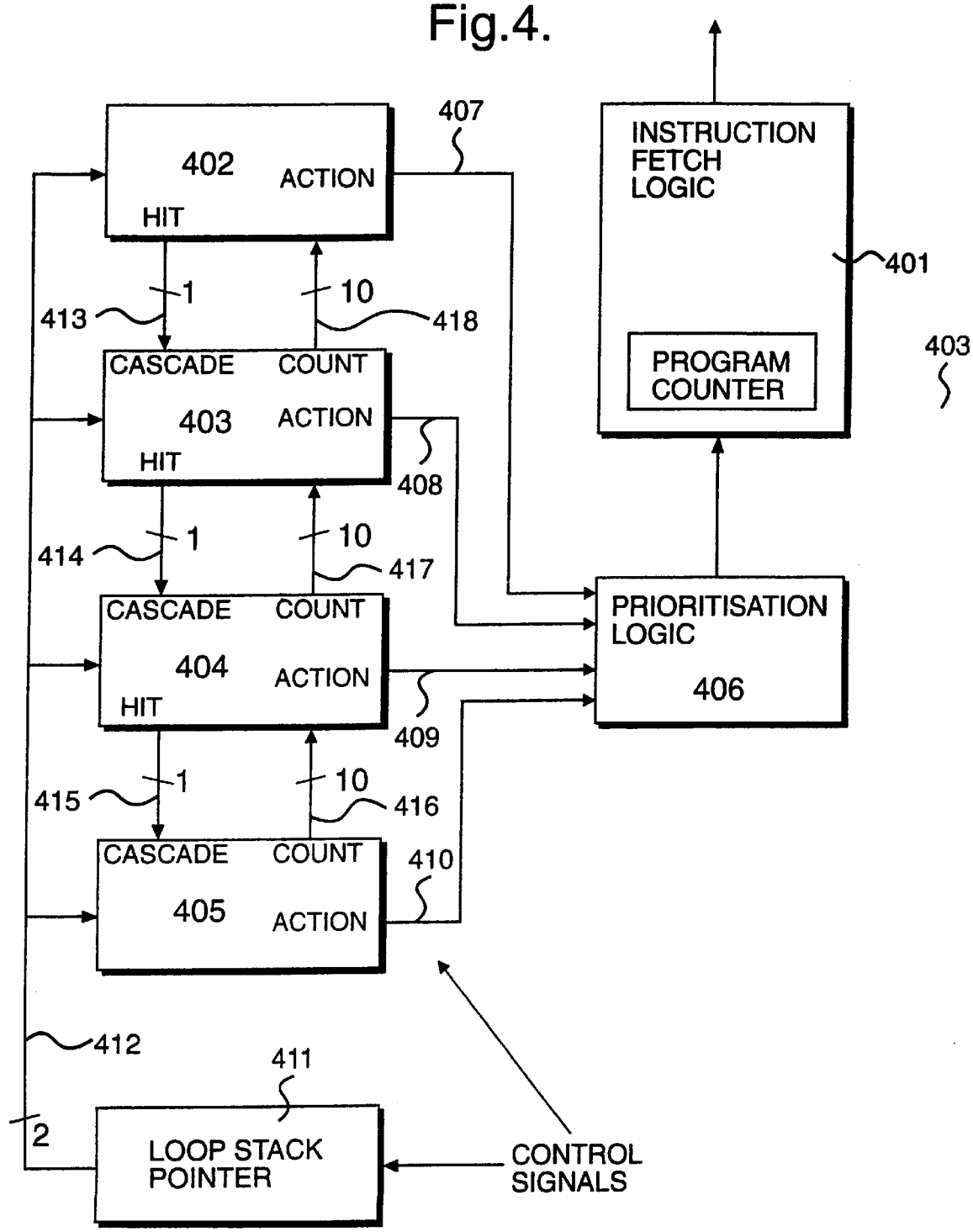
FIG. 4 details the instruction fetch unit identified in FIG. 3, including a plurality of looping circuits.

The instruction fetch unit 312 is detailed in FIG. 4, in which conventional operations of the instruction fetch unit are summarised by block 401. In addition, the instruction fetch unit 312 includes circuitry for controlling the operation of nested loops, consisting of a plurality of looping circuits. In the embodiment shown in FIG. 4, four looping circuits 402, 403, 404 and 405 are shown, allowing nesting up to a level of four. Outputs from each of these looping circuits are supplied to prioritisation logic 406 via respective lines 407, 408, 409 and 410. A two bit output from a loop stack pointer 411 is supplied to each of the looping circuits 402 over a stack pointer bus 412. When a looping circuit 402 to 405 detects that a looping operation has completed its required number of iterations, it supplies a "hit" signal to the next highest looping circuit within the cascade. Thus, looping circuit 402 provides a hit signal over line 413 to looping circuit 403, looping circuit 403 may provide the hit signal over line 414 to looping circuit 404 and looping circuit 404 provides a hit signal to looping circuit 405 over line 415. The looping circuits are also configured to facilitate triangulation looping and as such each circuit may provide looping details to the next lowest level of looping via a 10 bit bus. Thus, looping details from looping circuit 405 are transferred to circuit 404 over bus 416. With bus 417 providing a similar function between looping circuit 404 and 403 and circuit 403 transmitting similar information to circuit 402 via bus 418.

Figure 5:
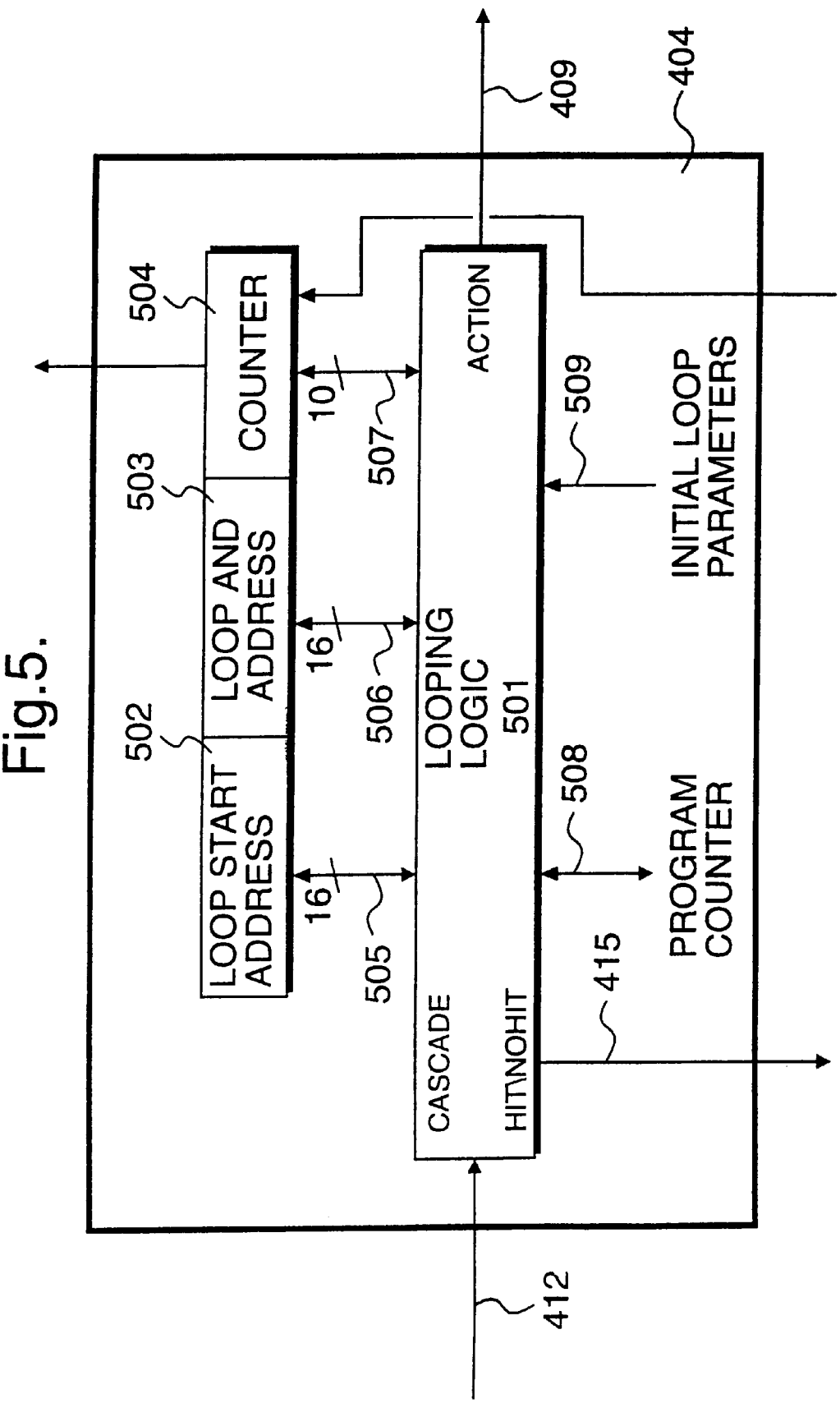
FIG. 5 details a looping circuit identified in FIG. 4.

Looping circuit 404 is detailed in FIG. 5. The looping circuit includes looping logic 501, configured to generate hit signals on line 415 and to receive hit signals on line 415. The looping logic circuit 501 also supplies action signals on line 409 to the prioritisation logic 406. The looping circuit 404 also includes a first register 502 for storing a loop start address, a second register 503 for storing a loop end address and a counter 504 for counting loop iterations. Consequently, a 16 bit bus 505 provides communication between the looping logic 501 and the loop start address 502. A similar bus 506 provides communication between the loop end address register 503 and the looping logic 501 with a 10 bit bus 507 providing communication between the looping logic 501 and the counter 504. A bus 508 provides communication between the looping logic 501 and the system program counter, within the instruction fetch logic 401. In addition, the looping logic 501 receives initial loop parameters via bus 509.

In operation, "DO" statements, defining the presence of a loop, are identified by the instruction decode unit 310. In response to a DO instruction being detected, the loop stack pointer is interrogated to determine the level of looping presently being executed. Thus, if the program is presently within a loop, looping circuit 405 will be active and a further level of nesting will require use of looping circuit 404. Similarly, if two levels of nesting are presently being invoked, a further level will be required by the operation of looping circuit 403 and in order to achieve four levels of nesting, it is necessary to instigate operation of looping circuit 402. In the embodiment disclosed, further nesting is not possible and if an attempt is made to write a program which requires further levels of nesting, this could result in a flag being set and/or an assembly generated error.

If, for the purposes of this example, it is assumed that looping circuit 405 is being used, a further level of looping will be instigated by use of looping circuit 404. The address of the first instruction in the loop is stored in the loop start address register 502. The loop end address is decoded from the program instructions.

The counter value can be decoded from a program instruction or obtained from a data register in a conventional manner.

Additionally, a special form of looping, referred to as triangulation looping, may be used in accordance with an embodiment of the present invention.

In triangulation looping the number of iterations of an inner loop are dependent on the number of times an outer loop has been run. In the following code the outer loop is executed 3 times. However, the lines within the inner loop are executed 3 times the first time the outer loop is executed but only 2 times on the next execution of the outer loop and so on:

```
DO   3
{
     DO
     {
          A1 = A1 + X1,;
          M1 = uY1 * A1,;
     }
}
```
If the loops are unrolled the resulting code is as follows:
A1 = A1 + X1,;   /* 1st iteration of outer loop */
M1 = uY1 * A1,;
A1 = A1 + X1,;
M1 = uY1 * A1,;
A1 = A1 + X1,;
M1 = uY1 * A1,;

```
A1 = A1 + X1,;    /* 2nd iteration of outer loop */
M1 = uY1 * A1,;
A1 = A1 + X1,;
M1 = uY1 * A1,;
A1 = A1 + X1,;    /* 3rd iteration of outer loop */
M1 = uY1 * A1,;
```

This clearly shows how triangulation looping operates.

The loop stack pointer is incremented, to the effect that a further level of looping will require looping circuit 403 and the system is now ready to perform further program execution.

During further execution, the looping circuit 404 is responsible for continually comparing the program counter value against the loop end address. Upon detecting this condition, the count value held in counter 504 is decremented and, assuming the value is not zero, the program counter is reset to the loop start address held in register 502. Eventually, a complete number of iterations will have been executed resulting in a further decrementing of counter value 504 reaching the zero level. The number of iterations has now been completed and the looping circuit 404 identifies this condition. Firstly, upon detecting this condition, the looping circuit would be disabled if looping were occurring at a lower level. Thus, if looping circuit 403 had been active, the looping logic 501 would be disabled by an appropriate signal supplied on line 414. Similarly, an active signal is required on bus 412 to represent the required level of looping. Thus, when these conditions are met an action signal is generated on line 409 which is supplied to the prioritisation logic 406. Thus, in this way, control of the looping operation has been taken away from the main program and the overall speed of operation has been improved by the operation of the looping circuit. Furthermore, while looping circuit 404 is active the higher level looping circuit 405 is also active. Thus, the completion of a loop controlled by circuit 404 may also coincide with the completion of a loop controlled by circuit 405. This results in action signals being generated by both circuits 404 and 405 simultaneously such that the prioritisation logic 406 may take appropriate action without incurring undesirable delays.

Figure 6:
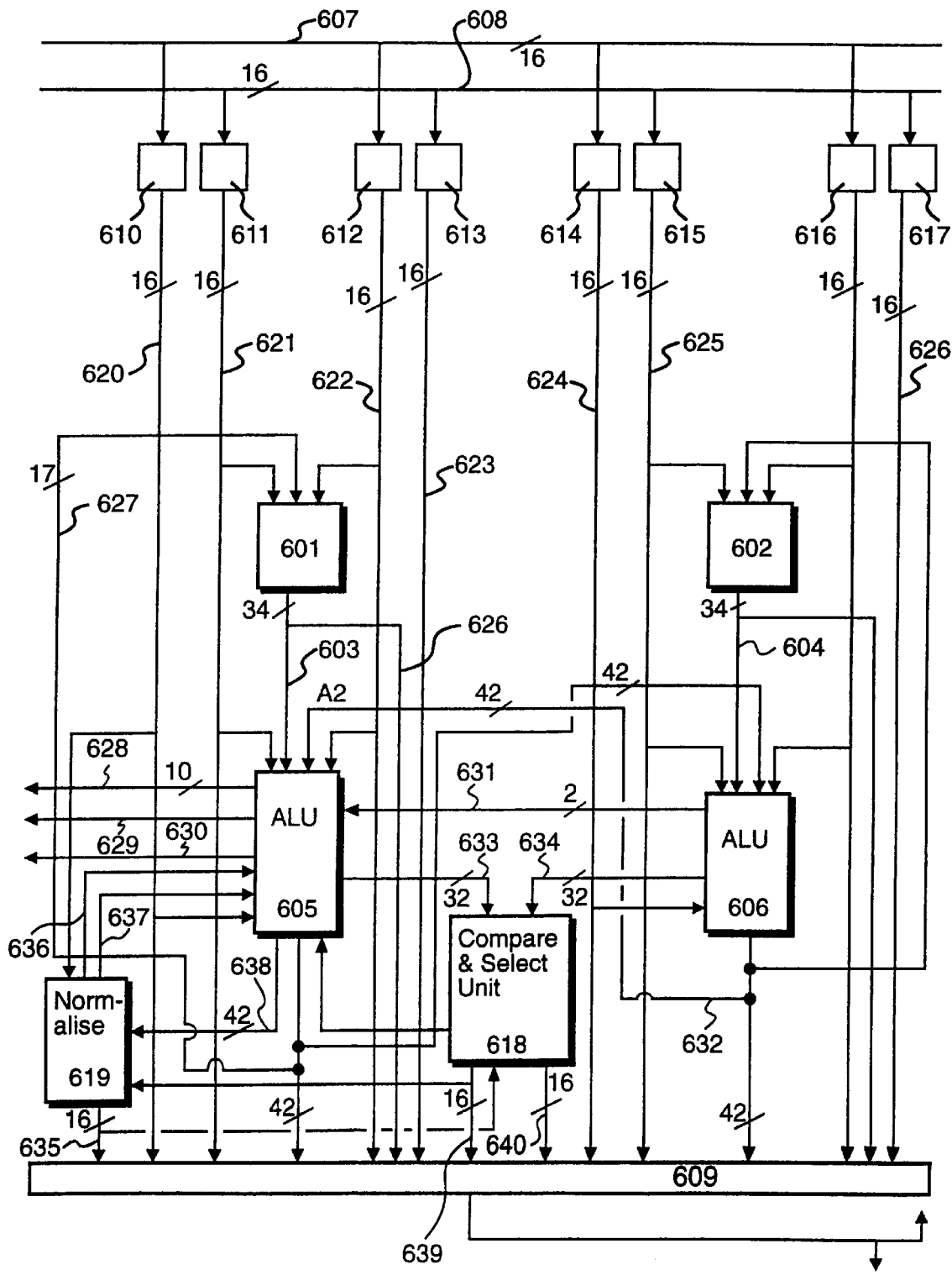
FIG. 6 details the data processing unit identified in FIG. 3, having two multipliers, two arithmetic logic units, a compare and select unit and a normalisation unit to facilitate the processing of floating point numbers.

Data processing unit 315 is detailed in FIG. 6. The data processing unit is arranged to perform multiplication operations by providing a first multiplier 601 and a second multiplier 602. Each multiplier provides a 34 bit output over respective buses 603 and 604 to respective arithmetic logic units, consisting of a first arithmetic logic unit 605, arranged to receive data from bus 603 and a second arithmetic logic unit 606 arranged to receive data from bus 604.

Data bus 407 provides for data transmission between the data processing unit 405 and the data memory 402 shown in FIG. 4. Returning to FIG. 6, this data bus is implemented as two 16 bit buses a first of which, first data bus 607, facilitates reading from the data memory 402 and writing to said data memory. A second data bus 608 is similar to data bus 607 but is only configured to read from the data memory 402.

The data processing unit includes an output multiplexer 609 configured to allow a plurality of output signals to be selectively returned to the first data bus 607 or to the data address generation unit 406.

A full clock cycle may be employed to allow the transfer of data from the data memory, given that each transfer to the data processing unit 405 is buffered by one of eight registers 610 to 617. The processing unit also includes a compare and select unit 618 and a normalising unit 619. All of the unit is clocked from a common clock source. However, in order to effectively double the speed of operation, devices to the left of the compare and select unit 618 are clocked on the rising edge of the clock source with devices to the right of the compare and select unit 618 being clocked on the falling edge of the clock source. The compare and select unit 618 is required to operate for both halves of the unit and is therefore clocked on both the rising and falling edges of the clock source. Input register 610 receives data from the first data bus 607 and, upon receiving a rising clock edge, clocks 16 bit data to the normalising unit 619 over a bus 620. Input register 611 clocks data from the second data bus 608 on a rising edge to the first multiplier 601 and to the first arithmetic logic unit 605 over bus 621. Input register 612 clocks data from the first data bus 607 on a rising edge to the first multiplier 601 over bus 622. Input register 613 clocks data from the second data bus 608 on a rising edge to the first arithmetic logic unit 605 over bus 623.

Input register 614 clocks data from the first data bus 607 on a falling edge to the second arithmetic logic unit 606 over a bus 624. Input register 615 clocks data from the second data bus 608 on a falling edge to the second multiplier 602 and to the second arithmetic logic unit 606 via bus 625. Input register 616 clocks data from the first data bus 607 on a falling edge to the second multiplier 602 and to the second arithmetic logic unit 606 over a bus 625. Input register 617 clocks data from the second data bus 608 on a falling edge to the second arithmetic logic unit 606 via bus 626.

The output from the first multiplier 601, supplied to the first arithmetic logic unit 605 over bus 603, is also supplied over a similar bus 626 to the output multiplexer 609. The output from the arithmetic logic unit 605 is returned to an input of the first multiplier 601 via a bus 627, which also supplies an output to the output multiplexer 609. Similarly, this output is also returned to an input of the second arithmetic unit, effectively as an extension of the same bus.

Ten bit bus 628 and single bit lines 629 and 630 supply data to sequencer 403 to facilitate conditional jumps. The second arithmetic logic unit 606 cannot instigate a conditional jump but overflow conditions may be identified over two control lines 631. The output from the second arithmetic logic unit 606 is returned to an input of the first arithmetic logic unit 605 via a bus 632, which also supplies said output to the output mutliplexer 609 and an input to the second multiplier 602. An output from the first arithmetic logic unit 605 is supplied to the compare and select unit 618 over a 32 bit bus 633 and a similar output is supplied to the compare and select unit 618 from the second arithmetic logic unit 606 over a 32 bit bus 634.

Normalising unit 619 produces an output exponent which is supplied, via a bus 635 to the output multiplexer 609 and to the compare and select unit 618. The normalising unit 619 generates shifting signals which are supplied to the first arithmetic logic unit 605 via shift buses 636 and 637. A 42 bit output is supplied from the first arithmetic logic unit 605 to the normalising unit 619 via a bus 638, while a bus 639 supplies an output from the compare and select unit 618 to the normalising unit 619 and to the output multiplexer 609. The data on bus 639 relates to the left side rising edge subcycle and a similar output from the compare and select unit concerning the right side falling edge subcycle is supplied to the output multiplexer 609 over a bus 640.

For the architecture shown in FIG. 6 and described in relation to a specific embodiment of the invention, arithmetic logic units 605, 606 provide respective exponent values from registers 611, 612, 615, 616 to compare and select unit 618. Optionally, an architecture may be configured such that registers 611, 612, 615, 616 provide exponent values directly to compare a select unit 618.

A compare and select unit 618 operates together with both the first arithmetic logic unit and the second arithmetic logic unit and in doing so it may compare a pair of exponent values whereafter one of said pair may be stored, dependent upon the result of the comparison. In this way, an extreme example taken from a plurality of exponent values, usually the largest exponent value is stored by the compare and select unit so as to facilitate subsequent processing and to significantly reduce the operational overhead of the arithmetic logic units. In particular, this stored value may be supplied over bus 639 to the normalising unit 619. In this way, the normalising unit may supply shifting signals to the arithmetic logic unit, in response to comparisons made by the compare and select unit, so as to normalise respective mantissa associated with exponents of floating point numbers considered by the compare and select unit.

In FIG. 7 a block of floating point numbers is represented as comprising floating point number 701, floating point number 702, floating point number 703 and floating point number 704. It should be understood that a large block of floating point numbers is often encountered in data processing. Each floating point number consists of a mantissa and an exponent portion. Typically, a block of floating point numbers of this type will result from a processing algorithm which is used in one of the processors 203, 204, 210 or 209 shown in FIG. 2 operating in the mobile phone. The exponent of floating point number 701, and the exponent of floating point number 702 are similar but not the same. Furthermore the other exponents in the block of floating point numbers are likely to be similar but not identical. In order to perform efficient data processing on a block of floating point numbers, it is preferable to have matching exponents throughout the entire block of numbers.

The arrangement shown in FIG. 6 facilitates efficient translation of a block of floating point numbers of the type shown in FIG. 7, into a block of floating point number of the type shown in FIG. 8, characterised by having identical exponents. There are two stages to the process of conversion from the block of floating point numbers represented in FIG. 7 to the block of floating point numbers shown in FIG. 8. The first process may be performed during generation of the floating point number block, or through a subsequent pass through the block of floating point numbers, during which exponents are compared and the greatest exponent is retained. Under program control, exponents are supplied to the compare and select unit 618, which is capable of performing comparisons between an incoming exponent and a retained high value exponent from previous comparisons. Thereby the exponents in a block of floating point numbers may be compared, and a highest exponent retained.

The second stage of the process, of converting from the block of floating point numbers shown in FIG. 7 to the block of floating point numbers shown in FIG. 8, is performed by the normalising unit 619. The highest value exponent which has been determined by the compare and select unit in the first process is retained as a number which is transferred over bus 639 to the normalising unit 619. The normalising unit receives exponents for each number in the block of floating point numbers to be converted and performs a subtraction between the highest value exponent and the exponents for each number in the block, such that the number of shifts of the mantissa that is required for each floating point number to be normalised to the highest exponent value is determined and supplied to the first arithmetic logic unit 605. The first arithmetic logic unit 605 includes a shifting circuit, which is capable of shifting the mantissa of the floating point number the desired number of binary places in a single cycle. In this way, in a two stage process, the block of floating point numbers shown in FIG. 7 is converted into the block of floating point number shown in FIG. 8, represented as floating point number 801, 802, 803 and 804. Thereby facilitating the manipulation of a block of normalised floating point numbers in the fixed point arithmetic logic unit 605.

Figure 9:
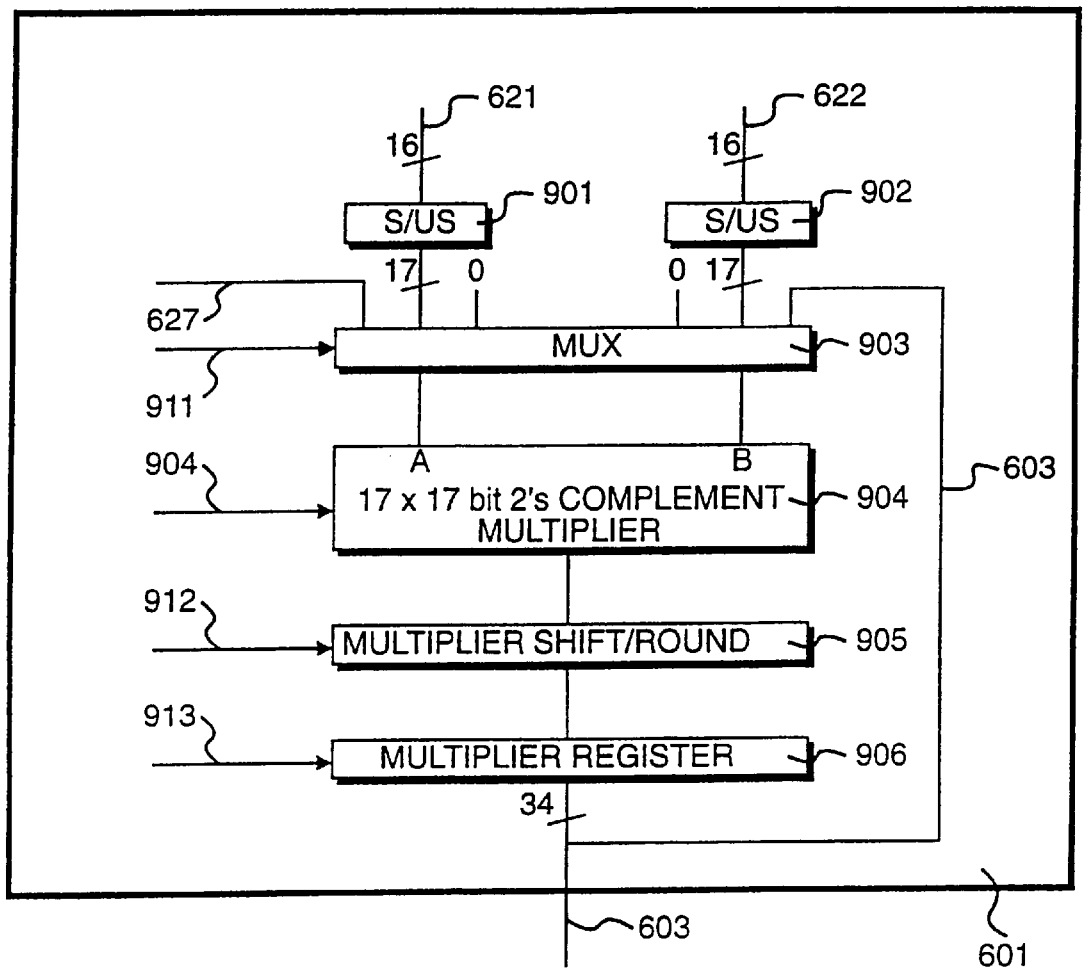
FIG. 9 details one of the multipliers shown in FIG. 6.

The multiplier 601 shown in FIG. 6 is detailed in FIG. 9. A first signed/unsigned multiplexer 901 receives control signals 911 from the sequencer 403. Data signals are received by multiplexer 901 from the data bus 621, which may then be considered as signed or unsigned under control of the sequencer 403. A similar arrangement occurs with a signed/unsigned multplexer 902 which receives signals from the data bus 622. A multiplexer 903 supplies A and B signals to a 17 bit two's compliment multipler 904. The product of this multiplication is supplied to a multiplier shift/round unit 905 which is controlled by control signals 912 from the sequencer 403. The output of the multiplier shift/round unit 905 is supplied to a multiplier register 906 which is controlled by sequencer 403 via control lines 913. The output of multiplier register 906 forms the bus 603, which may be supplied as an input to the multiplexer 903, thus facilitating feedback of multiplication products within the multiplier unit 601 itself. The multiplexer 903 may also receive predetermined fixed zero values as either or both of the multiplication operands, such that circuitry within the multiplier itself may be set to a static value, thereby reducing power consumption.

Figure 10:
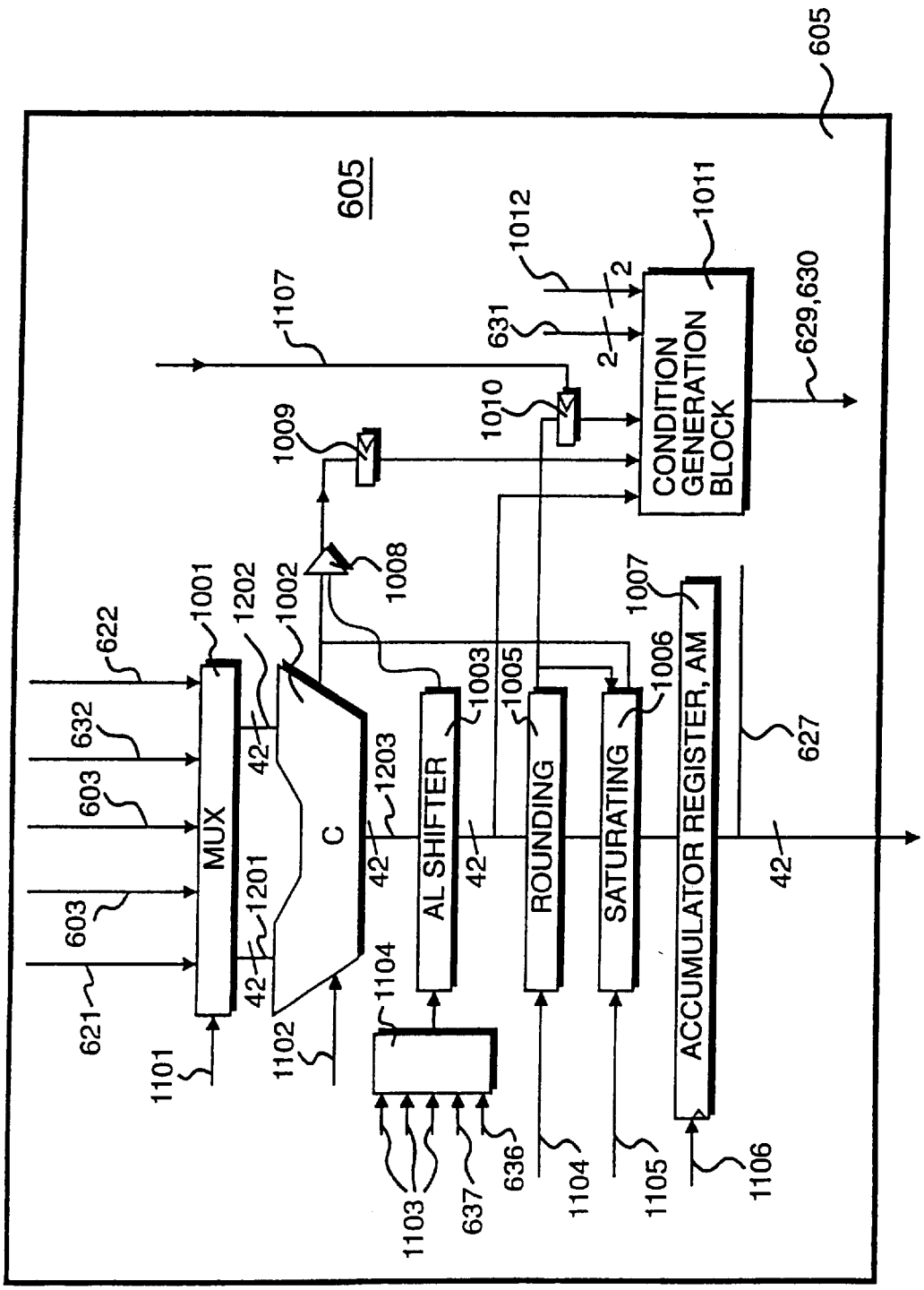
FIG. 10 details one of the arithmetic logic units shown in FIG. 6.

The first arithmetic logic unit 605 shown in FIG. 6 is detailed in FIG. 10. A multiplexer 1001 selects signals from bus 621, bus 603, bus 632, bus 622 or numeric value zero. Multiplexer 1001 is controlled by control signals supplied from the sequencer 403. An arithmetic logic circuit 1002 is controlled by control lines 1102 which are received from the sequencer 403. The arithmetic logic circuit 1002 has an numeric output 1203 which is supplied to an arithmetic logic shifter 1003. The arithmetic logic circuit 1002 further supplies condition signals to condition logic 1008, 1009, which facilitate conditional instructions, and exception condition detection.

The arithmetic logic shifter 1003 is controlled via control logic 1004, by control lines 1103, which are supplied from the sequencer 403. Control logic 1004 is also supplied by buses 636 and 637, which may be used to determine the number of binary places which the shifter should impose upon a binary number received via bus 1203. The output of the arithmetic logic shifter 1003 is supplied to a rounding unit 1005, which is controlled by a control line 1104 from sequencer 403. The rounding unit 1005 is used to convert highly precise but long binary numbers having 42 bits into shorter representations of said numbers, in order that they may be stored efficiently in memory and processed by other parts of the data processing unit which have input word lengths of less than 42 bits. The rounding unit also supplies a condition signal to condition detecting logic 1010, and a saturating circuit 1006.

The saturating circuit 1006 receives the numerical output from the rounding circuit 1005. The saturating circuit 1006 is able to perform a limiting function on numerical values which exceed a predetermined limit, again in order that large binary numbers may be reduced efficiently to a suitable word length for storage or subsequent processing. The saturation circuit 1006 is controlled by control line 1105 from sequencer 403. The saturation circuit may further be controlled by a condition signal from the arithmetic logic circuit 1002, which may indicate when a particular arithmetic logic operation has resulted in a numerical value which must be saturated.

The output of the saturating unit 1006 is supplied to an accumulator register 1007, which is clocked by a clock signal 1106. The accumulator register 1007 supplies signals to buses 627 and 628. Thereby it is possible for the accumulator register 1007 to supply a numerical value back to the multiplexer 1001, for further arithmetic logic operations.

A condition generation block 1011 receives numerical values from the arithmetic logic shifter 1003, and condition signalling from signalling logic 1008, 1009, 1010 and 1012. Signals 1012 are supplied from the compare and select unit 618. The condition generation block 1011 also receives signals from the bus 631. The condition generation unit supplies signals 629 and 630.

Figure 11:
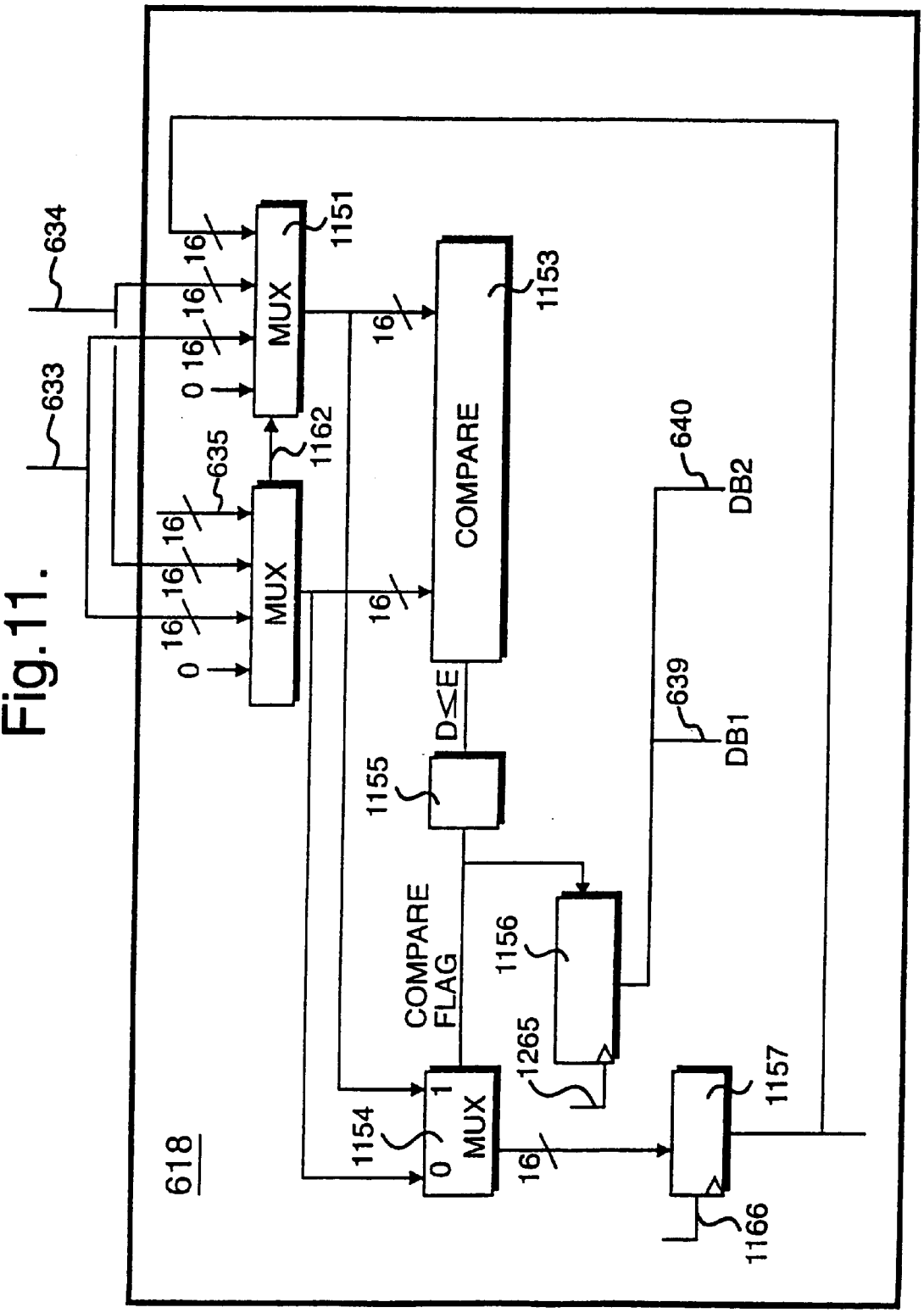
FIG. 11 details the compare and select unit shown in FIG. 6.

The compare and select unit 618 shown in FIG. 6 is detailed in FIG. 11. A low order word input multiplexer 1151 receives input values from bus 633 or bus 634.

Alternatively, a zero value may be used as a numerical input to this multiplexer. A high order word input multiplexer 1152 may also receive signals from bus 633, or bus 634, or a numerical value zero. Both input word multiplexers 1151 and 1152 are controlled by control signals 1161 and 1162 which are supplied from the sequencer 403. The low order input word multiplexer 1151 may supply numerical values to a compare unit 1153 or an additional multiplexer 1154. The high order input word multiplexer 1152 supplies its numerical value to a second input of the compare unit 1153, and a second input of the additional multiplexer 1154. A compare unit 1153 generates an indication as to whether the low order word input from multiplexer 1151 is greater than or equal to the high order word input supplied from multiplexer 1152. This indication is supplied as a signal to a maximum or minimum plurality inversion circuit 1155 which generates a compare signal, which is in turn supplied to the additional multiplexer 1154 or a compare select status register 1156.

The high order input word multiplexer 1152 is further capable receiving as an alternate input the output exponent from the normalising unit 619, represented as a bus 635. The output of the additional multiplexer 1154 is supplied as an input to a compare and select register 1157, its contents typically represent the highest of a sequence of compared exponents in a block floating point exponent comparison procedure. In order to facilitate such a procedure, the output of the compare and select register 1157 must be supplied as a numerical value over an internal bus 1199 via the low order word input multiplexer 1151 to the first input of the compare unit 1153. Then, as exponents are supplied to an input of the high order word input multiplexer 1152, comparisons may be made such that the highest of a sequence of compared exponents will end up being stored in the compare and select register 1157.

The compare and select status register 1156 supplies numerical values to buses 639 and 640. This register also receives a clock signal 1165 from control circuitry. The compare and select register 1157 is clocked by a signal 1166 from control circuitry.

Figure 12:
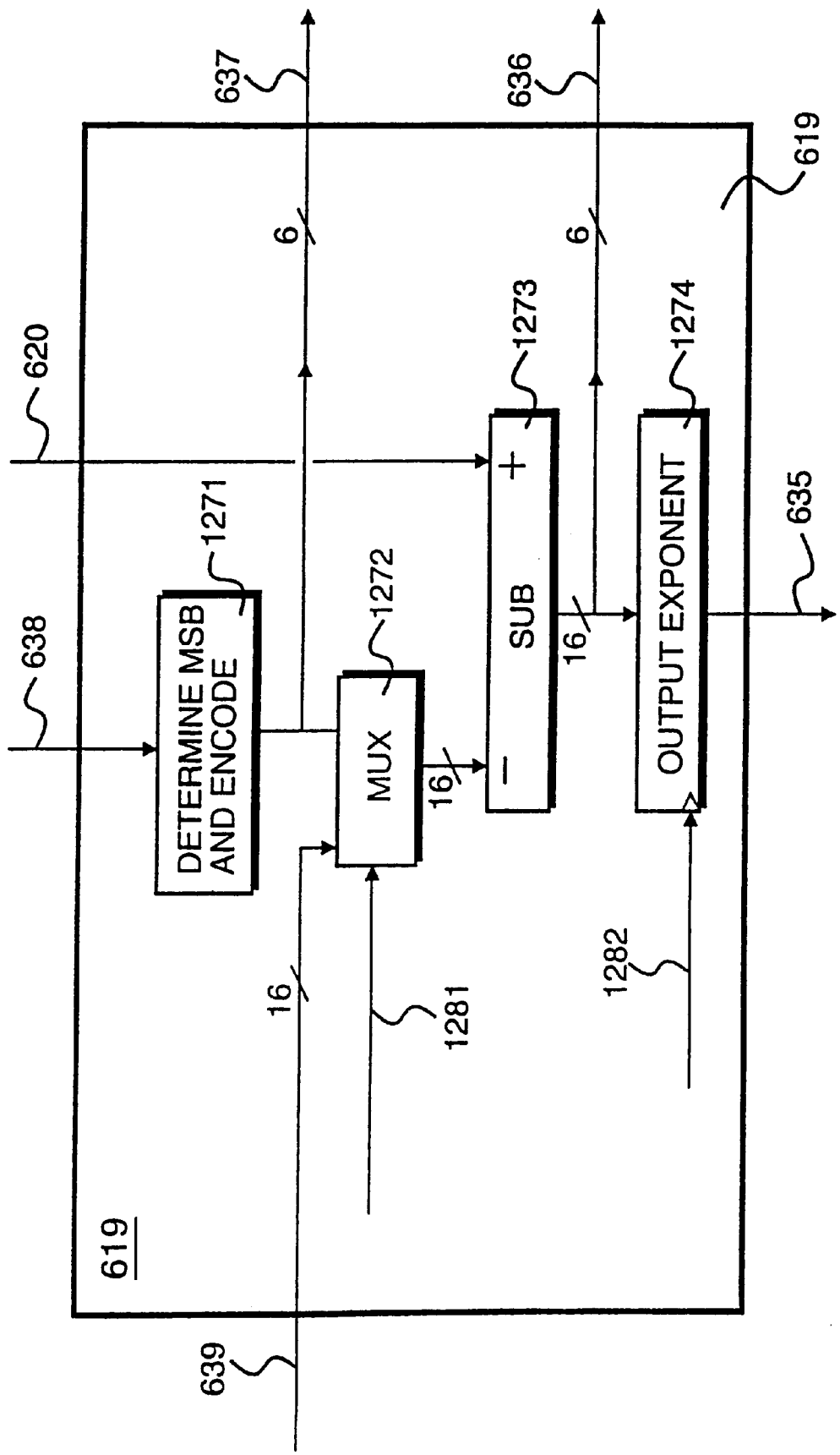
FIG. 12 details the normalising unit shown in FIG. 6.

The normalising unit 619 shown in FIG. 6 is detailed in FIG. 12. The bus 638 supplies 42 bit numerical values to a unit 1271 which determines the most significant bit of the numerical value, and encodes this as a 6 bit value supplied over bus 637. This 6 bit value 637 is further supplied to a multiplexer 1272 which may alternately receive a 16 bit numerical value from the bus 639 connected to the compare and select unit 618. The 16 bit output of the multiplexer 1272 is supplied as a subtracting input to a subtractor 1273. The multiplexer 1272 is controlled by a control signal 1281. An additional input to the subtractor 1273 is supplied from bus 620. The output of the subtractor 1273 is supplied to an output exponent register 1274, which is controlled by a clock signal 1282 supplied from control circuitry. Six bits of the output from the subtractor 1273 are supplied as bus 636. The output of the output exponent register 1274 is supplied as a 16 bit numerical value to the bus 635.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A data processing circuit arranged to execute program instructions defining nested loops, wherein a loop is defined in terms of a start address, an end address and a number of loop iterations, comprising:

program counting means;

a plurality of loop counting elements, wherein each of said loop counting elements includes a start address register, an end address register, a loop iteration register and means for comparing the value stored in the respective end address register with the output from said program counting means; and a loop stack pointer for providing a signal indicative of the level of looping being executed to said loop counting elements.

2. A data processing circuit according to claim 1, wherein said loop counting means are coupled in cascade so that data identifying the completion of a lower level loop is conveyed to the next higher level loop.

3. A data processing circuit according to claim 1, wherein each loop counting means generates end of loop data to facilitate plural loop terminations.

4. A data processing circuit according to claim 1, wherein a higher level loop counting means conveys loop size data to a lower level nested loop to facilitate triangulation looping.

5. A data processing circuit according to claim 1, wherein said program counter and said loop counting elements form part of an instruction fetch circuit included as a sub- assembly of an integrated digital signal processing circuit.

6. A mobile telephone including a digital signal processing circuit according to claim 5.

7. A data processing circuit according to claim 1, wherein in response to a program starting a loop, if the loop stack pointer provides a signal indicating that a loop is being executed, an additional loop counting element will become active.

8. A method of executing program instructions defining nested loops, wherein a loop is defined in terms of a start address, an end address and a number of loop iterations, comprising:

identifying program position by program counting means;

identifying the position within each loop by loop counting elements, wherein each of said loop counting elements stores a loop start address, a loop end address and a loop iteration number such that said elements are arranged to compare said stored loop values with said program count; and providing a signal indicative of the level of looping being executed to said loop counting elements.

9. A method of executing program instructions according to claim 8, wherein data identifying the completion of a lower level loop is conveyed to the next higher level loop by means of said loop counting means being coupled in cascade.

10. A method according to claim 8, wherein end of loop data is generated by said loop counting means to facilitate plural loop terminations.

11. A method according to claim 8, wherein loop size data is conveyed to a lower level nested loop to facilitate triangulation looping by higher level loop counting means.

12. A method according to claim 8, wherein an instruction fetch circuit is included as a sub-assembly of an integrated digital signal processing circuit including the program counter and the loop counting elements.

13. A method of operating a mobile telephone according to claim 8.

14. A method according to claim 8, wherein in response to a program starting a loop, if said signal indicative of the level of looping indicates that a loop is being executed, an additional loop counting element becomes active.

* * * * *